(No Model.) 3 Sheets—Sheet 2.
C. POLLAK.
CURRENT STRAIGHTENING COMMUTATOR.

No. 558,983. Patented Apr. 28, 1896.

Witnesses:—
W. E. Bowen
L. Holloway

Inventor
Carl Pollak,
By J. R. M. Bowen
Atty.

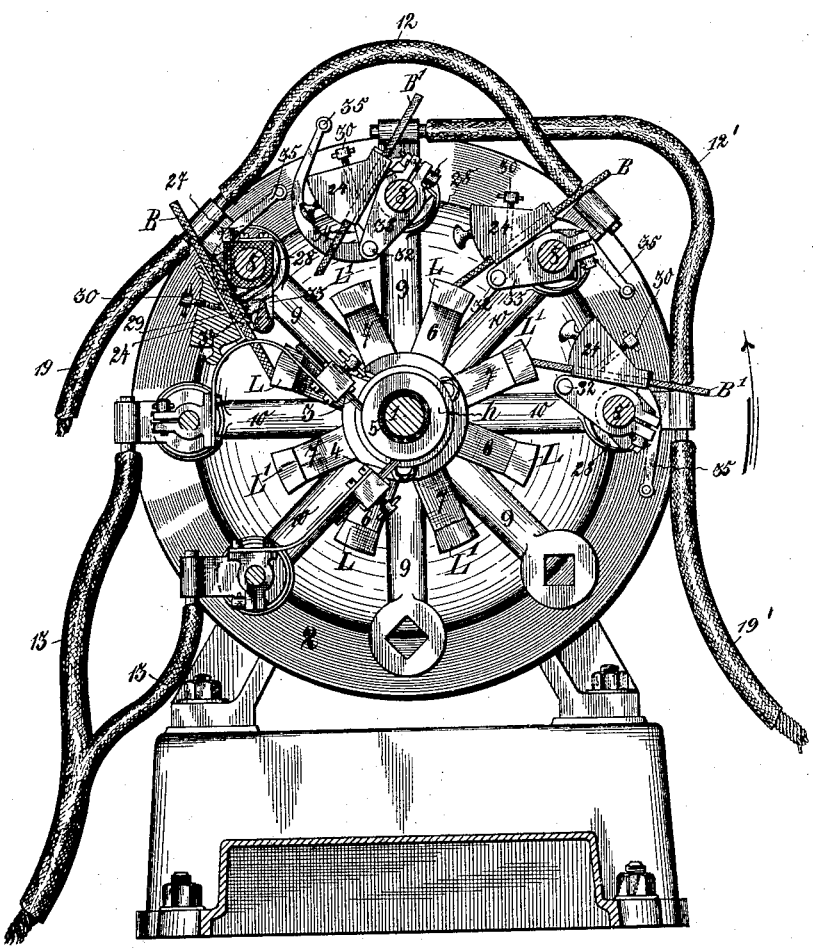

UNITED STATES PATENT OFFICE.

CARL POLLAK, OF FRANKFORT-ON-THE-MAIN, GERMANY.

CURRENT-STRAIGHTENING COMMUTATOR.

SPECIFICATION forming part of Letters Patent No. 558,983, dated April 28, 1896.

Application filed August 28, 1895. Serial No. 560,744. (No model.)

*To all whom it may concern:*

Be it known that I, CARL POLLAK, a subject of the Emperor of Austria-Hungary, residing at Frankfort-on-the-Main, Germany, have invented certain new and useful Improvements in Current-Straightening Commutators, of which the following is a specification.

This invention relates to means for producing unidirectional currents from alternating currents. If in an alternating-current circuit a commutator is interposed which runs synchronously with the generator in said circuit, a direct pulsating current is obtained which ranges from zero to a maximum voltage, which maximum depends on the construction of the generator. Such current can be used for many purposes requiring direct current. It is not, however, adapted for charging storage batteries or for the operation of continuous-current motors or other devices having a substantial counter electromotive force. In the case of the storage battery, the instant the electromotive force of the charging-machine falls below that of the battery the latter will discharge current into the machine; but this difficulty is overcome by using the present apparatus, which commutates or straightens the alternating-current impulses, but collects and utilizes only that part of the pulsations of the electromotive force which is equal to or higher than that of the storage battery or other device being operated.

Figure 1:
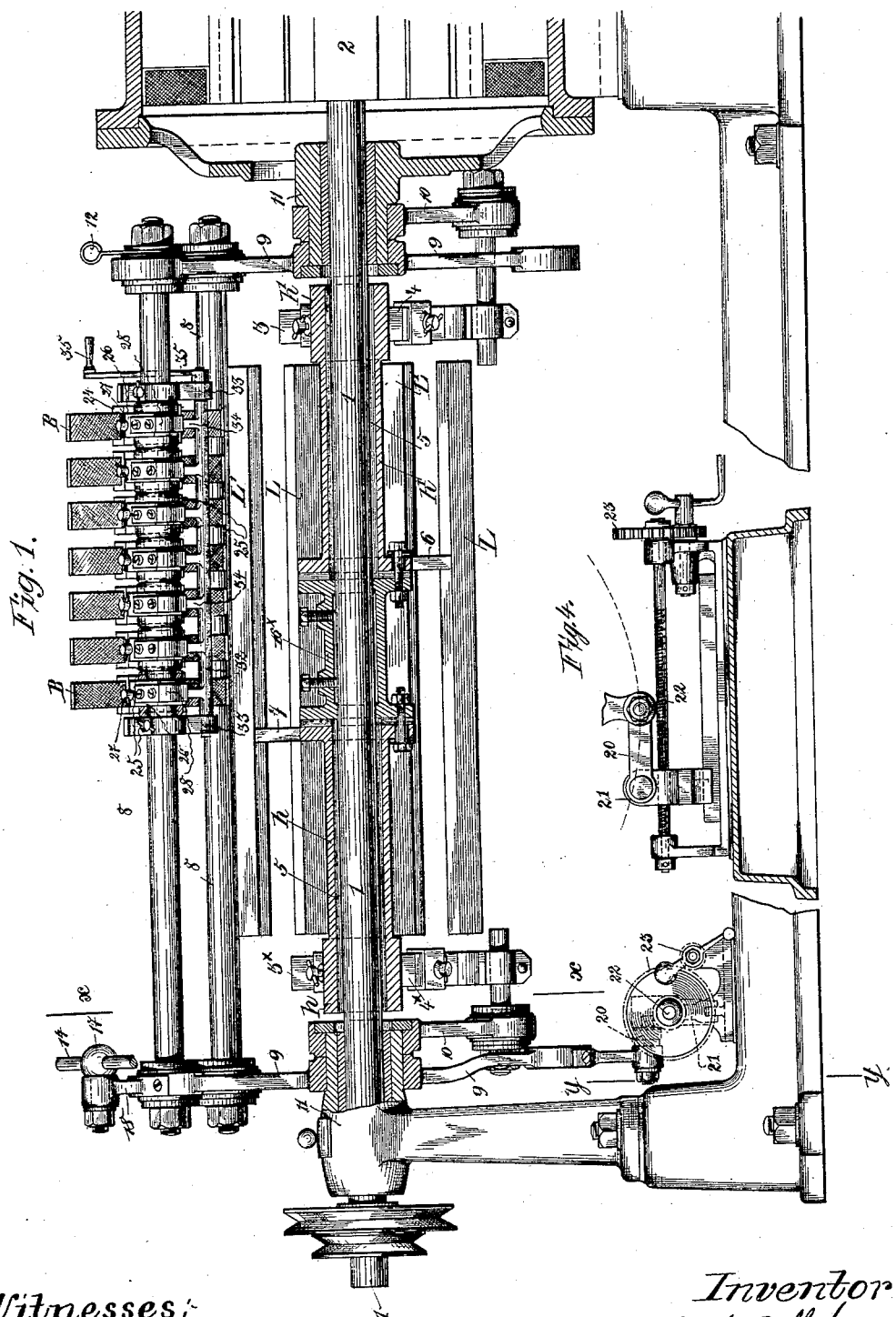
Figure 2:
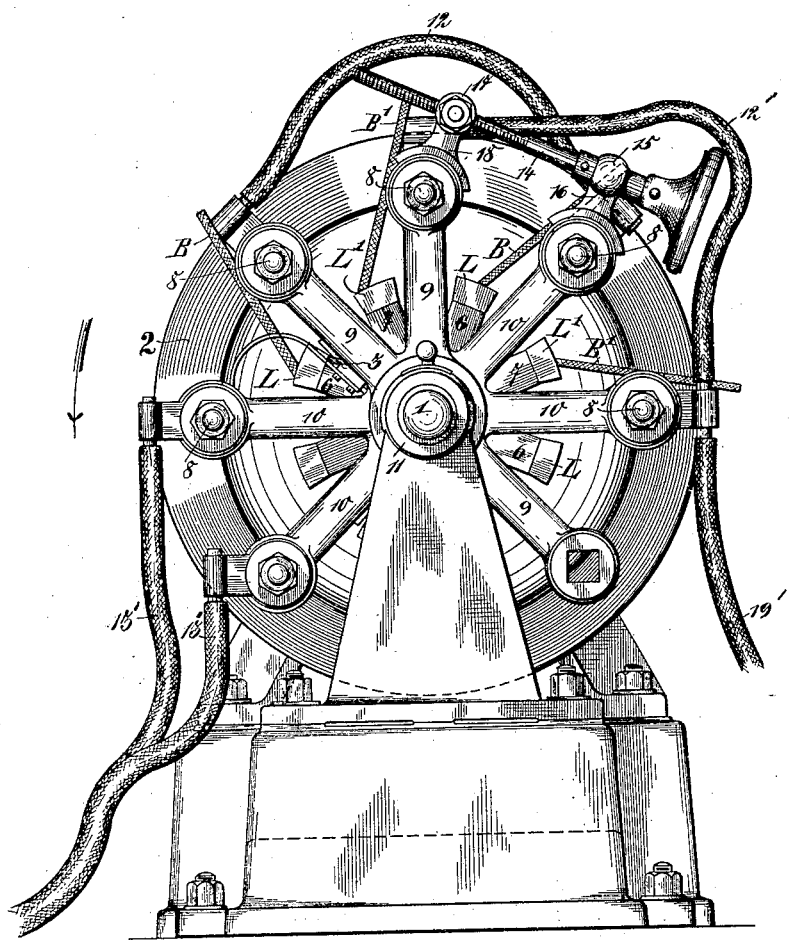

In the drawings, Figure 1 is a sectional side view of the preferred apparatus. Fig. 2 is an end view, the pulleys shown at the left-hand side of Fig. 1 being omitted. Fig. 3 is a section on line $xx$ of Fig. 1, one of the brush-holders with its brush being shown in section, while the other brush-holders with their brushes are shown in end view; and Fig. 4 is a section on line $yy$ of Fig. 1, showing the device for adjusting all the brushes simultaneously.

In Fig. 1, 1 is a shaft having a driving-motor 2, adapted to rotate synchronously with a more or less distant alternating electric generator. (Not shown.) Each pole of the circuit of this alternating generator is connected with two brushes 3 4, (see also Fig. 3,) one pair of which bears on the hub $h$ and the other pair on the hub $h'$ of the commutator-cylinder, also on shaft 1. These hubs, which are insulated from the shaft by insulating-sleeves 5, are flanged and have radial arms 6 7. Four arms 6 and four arms 7 are shown in Figs. 2 and 3, the arms 6 and also the arms 7 being forty-five degrees apart. At the outer ends of the said arms extend at right angles thereto the commutator-segments L and L'. The number of segments carried by the hubs is equal to the number of the arms, and these segments L L' point in opposite directions and alternate with each other at regular intervals. Said segments are a considerable distance apart, so that the brushes B B' used will not span the spaces between the segments, and this causes the commutator to fail to collect the lower tension portions of the alternating impulses which enter the commutator. The segments are preferably as far apart as their own width, or farther.

On the shaft between the hubs is secured a sleeve $16^\times$, having flanges secured to but insulated from the flanged hubs $h\ h'$ to hold them in place. In this apparatus the brushes are arranged in two groups, in Figs. 2 and 3 two brushes B B B' B' being shown in each group; but preferably two series of brushes will be used in each group. One of such series is shown in Fig. 1. The number of brushes in each series may vary as required. Each series is mounted on a rod 8, the ends of which are secured to and insulated from arms 9 10, extending radially. The four radial arms 9 form an X-shaped body—that is, a cross of St. Andrew—and so also do the four arms 10. Two of these crosses are arranged one after another near each end of the shaft 1 upon the shaft-bearings 11, so as to be capable of being rotated. The middle lines of the said two crosses are perpendicular to each other. The crosses 9 9 9 9 have secured to their upper arms two neighboring rods 8 8, one of which carries the one series of brushes B belonging to the one group and the other of said rods 8 carries the one series of brushes B' belonging to the other group. The crosses 10 10 10 10 have secured to their arms extending to the right-hand side of Fig. 2 also two rods 8 8, the upper of which carries the second series of brushes B belonging to the first group and the lower of the said rods 8 carries the second series of brushes B' belonging to the second group. Both series of each group are electrically connected by a cable 12. The opposite arms of the crosses 10 are connected, respectively, with the wires 13, leading to the generator. (Not shown.) The said arms carry also the brushes 3 4, which bear upon the hubs $h\ h'$ of the commutator-cylinder.

In order to be able to vary the distance between the series of brushes of each group of brushes, both the crosses 9 and 10 on one side of the shaft 1 only are connected by an adjusting-screw 14, (see Fig. 2,) which is mounted in a guiding-piece 15, being movable in an upper extension 16 of the upper arm of the cross 10 and is screwed with its thread in a nut 17, fixed movably in an extension 18 of the upper arm of the cross 9. By turning this screw 14 in one or the other direction the crosses 9 and 10 will be moved toward or from each other, whereby the brushes B B' on the right-hand side of Fig. 2 will be approached to or removed from the brushes B B' on the left-hand side—that is, in a radial position. By this adjustment the distance between the two series of brushes of each group can be changed, so that the brushes will make contact with segments L L', respectively, simultaneously, or, as shown in the drawings, at different times, whereby the current impulses collected will overlap to a greater or less extent. The current straightened by the described commutator flows through the wires 19, Fig. 3, to a storage battery or other straight-current device to be operated, but not shown.

For the purpose of being able to place all the brushes 3 4 B B' simultaneously in the neutral position the lowest arm of the cross 9 (see Fig. 1, left-hand side, and Fig. 4) is connected by a link 20 to a sliding nut 21, arranged upon a screw-shaft 22, which can be rotated by means of a gearing 23 in one or the other direction, the said lowest arm of the cross 9 being bent somewhat inwardly, so as to allow a simple connection with the sliding nut 21.

It is to be remarked that each brush B or B' of each series has a separate holder 24, Fig. 3, which has two eyes 25, Fig. 1, through which the rod 8 is passed. Between the said eyes a collar 26 is fixed adjustably on the rod 8 by a set-screw 27. The said collar carries a spring 28, the free end of which acts upon the holder 24. Each holder 24 has a channel for the reception of the brush B or B', which bears on the outer side against a pressing-plate 29, which is acted upon by a set-screw 30, arranged in a weighted part of the holder 24; and in order to be able to take off the brushes of each series simultaneously for the purpose of replacing and adjusting the brushes a shaft 32 is mounted below the holders of each series in brackets 33, depending from the respective rod 8, the said shaft being provided with as many projections 34 as there are holders in each series. When the shaft 32, which can be rocked by means of a handle 35, is in the position shown in Fig. 3, left-hand side, then all the brushes of the respective series will bear upon the segment L beneath them; but when the shaft is rocked in the position shown in the uppermost part of Fig. 3 then the projections 34 have lifted the holders so that the brushes are removed from the segment L'. Each shaft 32 can be adjusted with regard to the brush-holders, as the brackets 33, carrying the shaft 32, are fixed adjustably on the respective rod 8.

The pulleys shown on the shaft 1 at the left-hand side of Fig. 1 serve the purpose of setting the commutator in motion.

The operation of the apparatus described is as follows: The alternating current passes through the wires 13 and the brushes 3 4 on each end of the commutator-cylinder to the hubs $h\ h'$ and thence to the segments L L'. As the commutator is moved by the motor 2 synchronously with the generator, the segments L L', which form terminals of opposite polarity, are reversed in polarity with alternations of current. When the segments have with regard to the brushes B B B' B' the position shown in Fig. 2, then, the commutator rotating in the direction of the arrow indicated, the current leaves by the brushes B B, connected by wire 12 with each other, and by wire 19 with the one pole of a storage battery or other straight-current device. After having passed the said device the current returns from the other pole of the said device through the wires 19' and 12', the brushes B' B', the segments L' L', the brushes $3^\times\ 4^\times$, and the wires 13' to the other binding-post of the generator. As the segments L L' must make contact with the brushes B B' only so long as the voltage of the current is higher than the voltage of the storage battery, the distance between the brushes of both the groups of brushes B B' is to be regulated correspondingly by means of the adjusting-screw 14, as before said. Therefore as soon as during the rotation of the commutator-cylinder the segments L L' have left behind themselves the brushes B B' no more of the current is conducted through the storage battery. During the time which passes before the segments L L' of the rotating commutator-cylinder again make contact with the brushes B B' the electromotive force ceases and begins again and reaches the necessary voltage. Now the brushes B B make contact with the segments L' L' and the brushes B' B' make contact with the segments L L. Therefore the current now takes the same way from the brushes B B through the storage battery to the brushes B' B', as before, but returns now from the brushes B' B' through the segments L L to the corresponding binding-post of the generator. In the further rotation of the commutator-cylinder the brushes B B again make contact with the segments L L and the brushes B' B' with the segments L' L', and so on. It is to be seen from the above that the succeeding impulses of the alternating current are sent the same way through the storage battery, so that the latter will be charged, and as only that part of the impulses will be transmitted which is of higher voltage than the counter electromotive force of the storage battery no discharge of the said battery can take place.

Having thus described my invention, what I claim as new, and desire to secure by Letters Patent, is—

1. In a current-straightening commutator, the combination of insulated hubs $h$, $h'$, having alternated segments L L', and commutator-brushes in sets, connected alternately, the segments being as far as or farther apart than the thickness of the brushes, whereby current impulses above a predetermined potential only are collected, substantially as set forth.

2. In a current-straightening commutator, the combination of segments L L' connected alternately, and brushes in sets arranged so as to make and break contact with different segments at different intervals, and the segments being as far as or farther apart than the thickness of the brushes, substantially as set forth.

3. In a current-straightening commutator, the combination of insulated hubs $h$, $h'$, having alternated segments L L', and sleeve $16^\times$ secured to the shaft between the hubs and to said hubs to hold the latter in place, said sleeve being insulated from the hubs, substantially as set forth.

4. In a current-straightening commutator, the combination of segments, commutator-brushes in sections connected alternately, means for moving a section of each brush toward or from another section of the same brush, and means for simultaneously adjusting all the sections of all the brushes in one direction, substantially as set forth.

5. In a current-straightening commutator, the combination of commutator-segments connected alternately, radiating arms in pairs, the two arms of each pair being next to each other, the arms supporting the brushes, and means, as screw 14, between arms of different pairs for moving one section of each brush toward or from the other sections of the brushes, substantially as set forth.

6. In a current-straightening commutator, the combination with segments connected alternately, the width of these segments being equal to or smaller than the distance between them, of brushes in sets, the brushes being adjustable peripherally of the commutator in order to regulate the length of the current impulses, substantially as set forth.

In testimony whereof I have signed my name to this specification in the presence of two subscribing witnesses.

CARL POLLAK.

Witnesses:
ALVESTO S. HOGUE,
JEAN GRUND.